No. 764,112. Patented July 5, 1904.

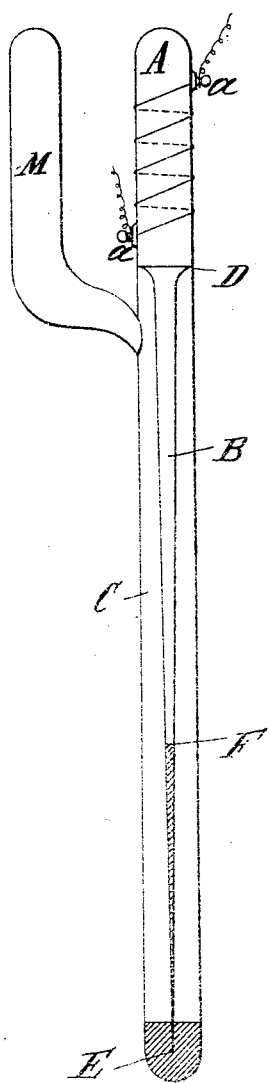
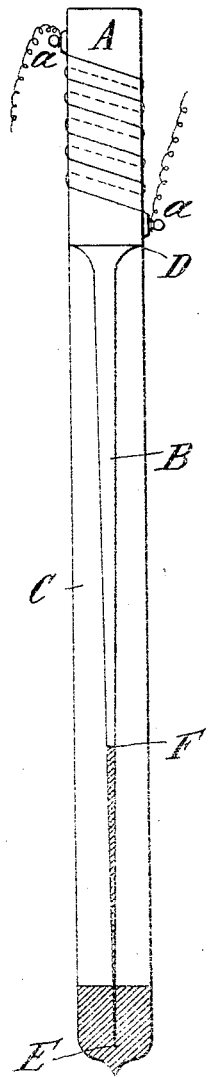
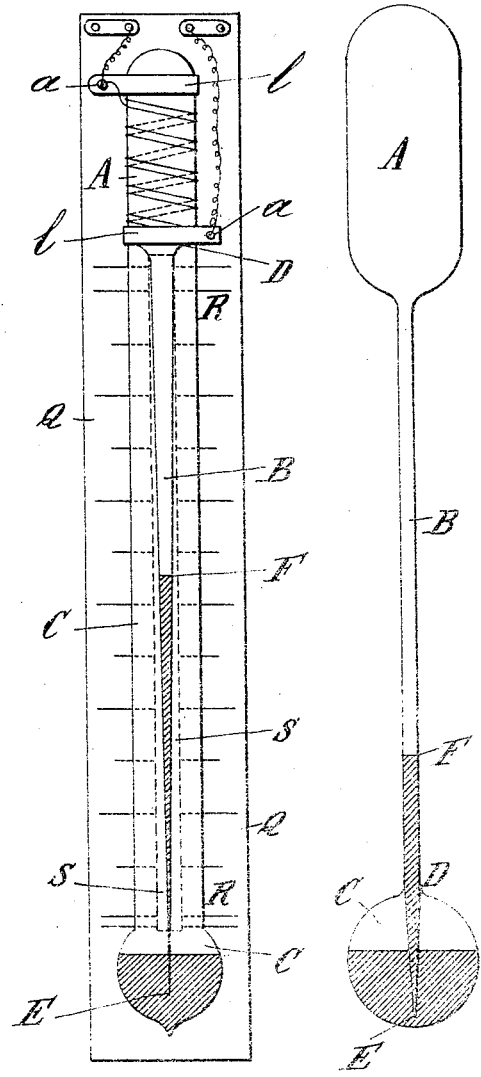
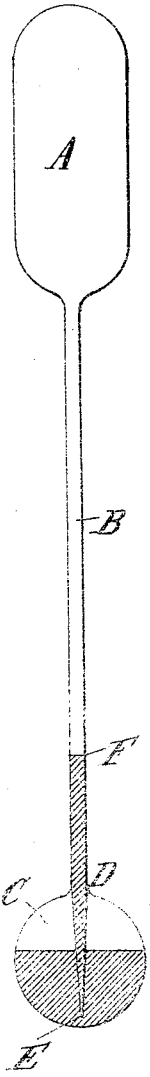

UNITED STATES PATENT OFFICE.

CARLO CLERICI, OF MILAN, ITALY.

ELECTRICITY-METER.

SPECIFICATION forming part of Letters Patent No. 764,112, dated July 5, 1904.

Application filed November 30, 1903. Serial No. 183,179. (No model.)

*To all whom it may concern:*

Be it known that I, CARLO CLERICI, electrical engineer, a subject of the King of Italy, residing at 6 Via Broggi, Milan, Italy, have invented certain new and useful Improvements in Electricity-Meters; and I do hereby declare the following to be a full, clear, and exact description of the invention, such as will enable others skilled in the art to which it appertains to make and use the same.

This invention refers to that class of electricity-meters which are based on the expansion of a volume of gas when heated by means of a coil through which the current to be measured or a current proportional thereto is caused to flow. This meter may be used either as an ammeter or voltmeter or volt-ammeter both for direct reading and also as a maximum-demand indicator, the latter being the use for which the apparatus is specially intended. In other maximum-demand indicators heretofore known wherein a suitable liquid acts as a seal preventing the escape of the gas the heating of a bulb by means of a coil through which the current to the consumer is taken has been availed of; but these prior apparatus are based on the principle of forming a trap which catches the liquid that overflows when the bulb is warmed by the current flowing through the coil. According to the present invention the liquid, on the contrary, always forms a continuous column and is never parted by the action of the current into two separate bodies.

The working of the new apparatus will be better understood by means of the accompanying drawings, wherein—

Figure 1 is a diagrammatic sketch of a device embodying the principle on which the new meter is based, while Figs. 2 to 4 show different forms in which my invention may be practically carried into effect.

According to Fig. 1, A is a glass bulb connected with a tube B, tapering downward, whose lower end enters another bulb C, containing a suitable (not too volatile) liquid, but not filled therewith. Tube B and bulb C are welded together at point D. The open end E of tube B dips into the liquid. On tube A being heated, the gas contained therein expands and finds its way out the orifice E, rising in bubbles through the liquid. On A being allowed to cool, the equilibrium will be restored as soon as a quantity of liquid proportional to the quantity of gas driven out from A, and therefore to the whole quantity of heat received by A, has risen along the tube B up to the level F.

Fig. 2 shows a modified form of the same apparatus, according to which the difficulty of welding tube B to bulb C at point D, Fig. 1, is done away with. According to Fig. 2 the bulb C, Fig. 1, is substituted by a tube surrounding the thin tube B throughout and welded to the upper bulb A at D. $a\,a$ are the terminals of the coil surrounding the bulb A.

The working of the apparatus is the same as already described with reference to Fig. 1. The position of point F is of course to be ascertained by means of a suitable scale.

The apparatus may be employed as an ammeter if the coil $a\,a$ be inserted in series into the circuit through which the current to be measured flows. It will, on the contrary, work as a voltmeter on coil $a\,a$ being shunted between two points of a circuit whose potential difference is to be ascertained. In both cases the apparatus will act as a maximum-indicator, as the liquid column risen up to F within the tube B will not sink on the current lessening gradually or suddenly or being entirely turned off. The instrument may nevertheless be also employed as a direct-reading ammeter or voltmeter if the tube B be allowed to fill with liquid and the sinking of the liquid within it be measured while the current is on.

To reset the instrument, A must be heated so as to drive out the whole liquid from the tube B. The instrument is then turned upside down, so as to cause orifice E to emerge from the liquid, which will collect at the lowest part of bulb C, Fig. 1, respectively, of tube C, Fig. 2—that is, at the part which is at the top when the instrument is in its normal working position. (Shown in the drawings.)

Fig. 3 shows a more complete form of the instrument, the same being mounted on a wood tablet Q, provided with a scale R, having in its middle a slot into which a mirror S is inserted to facilitate the correct reading of the height of the liquid column. Two brass hoops *l* secure the ends of the heating-coil to both ends of the bulb A.

According to Fig. 4 the tube C is connected with an expansion-chamber M, intended to compensate for the differences of temperature of the ambient air, especially in the case of the instrument being inclosed in a box, as it is usually the case when employed to prevent the surreptitious addition of lamps by the consumer.

The instrument may also be fitted with a cut-out switch to allow of the reading when the current is on, which is by far the most seldom case, as the instrument will find its chief employment in lighting plants, and the reading will have to take place during the day.

Having now described my invention and how the same is to be carried into effect, what I claim as my invention is—

An electricity-meter intended to be employed chiefly as a maximum-demand indicator, consisting of a bulb connected with a thin tube open at its lower end, the whole being sealed to a glass receptacle containing a suitable liquid, into which the orifice of said tube dips, the bulb being surrounded by a coil through which the current to be measured is caused to flow and the tube open at its lower end, being fitted with a scale allowing of readily ascertaining the height of the liquid column, which under the action of the current rises within the tube in the form of a continuous undivided body, and does not sink on the current being turned off.

In testimony whereof I affix my signature to this specification in the presence of two witnesses.

CARLO CLERICI.

Witnesses:
BARTOLOMES SALVOTTI,
GHIONI EPIFANIO.